No. 643,446. Patented Feb. 13, 1900.
D. J. AMES & H. N. LABARE.
GRAIN DRILL.
(Application filed Nov. 13, 1899.)
(No Model.) 2 Sheets—Sheet 1.
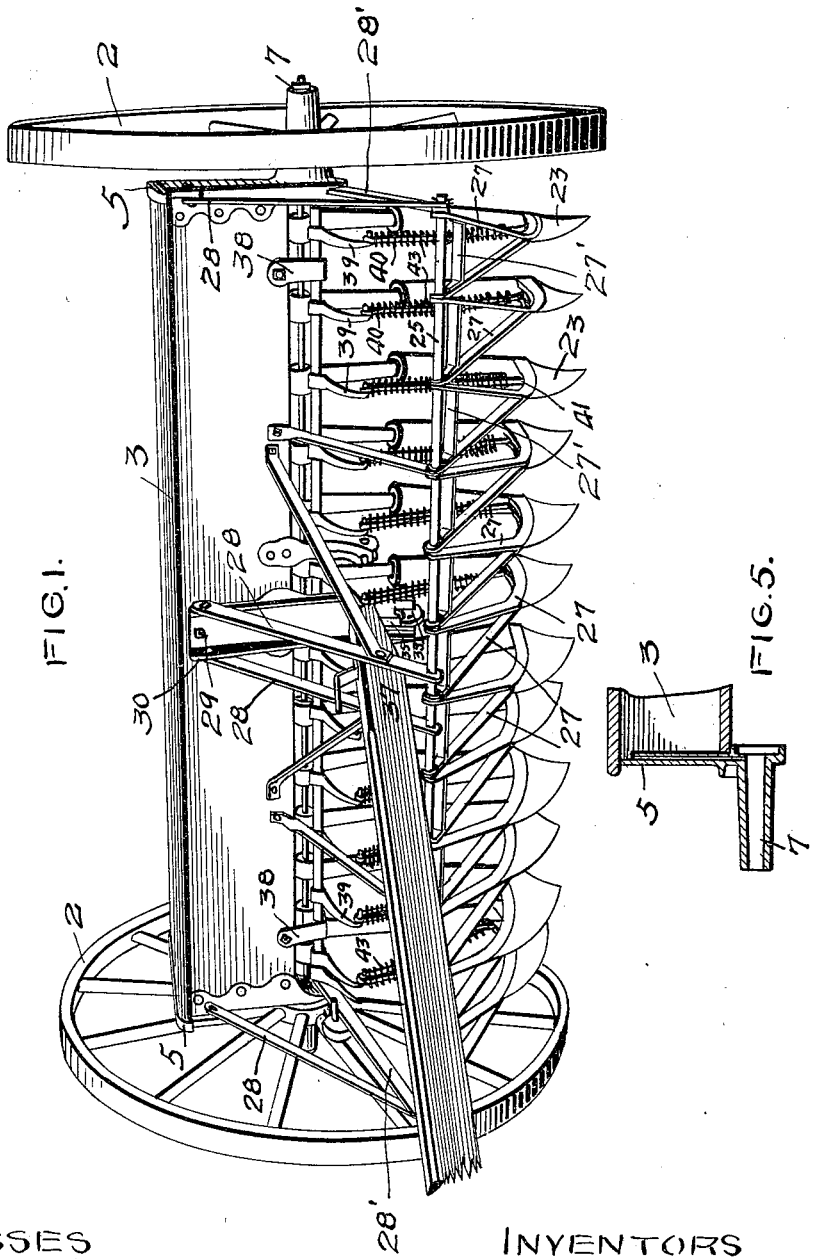
WITNESSES
E. G. Staude
A. F. Holmes
INVENTORS
DAVID J. AMES,
HENRY N. LABARE.
BY Paul O. Hawley
THEIR ATTORNEYS
THE NORRIS PETERS CO., PHOTO-LITHO., WASHINGTON, D. C.

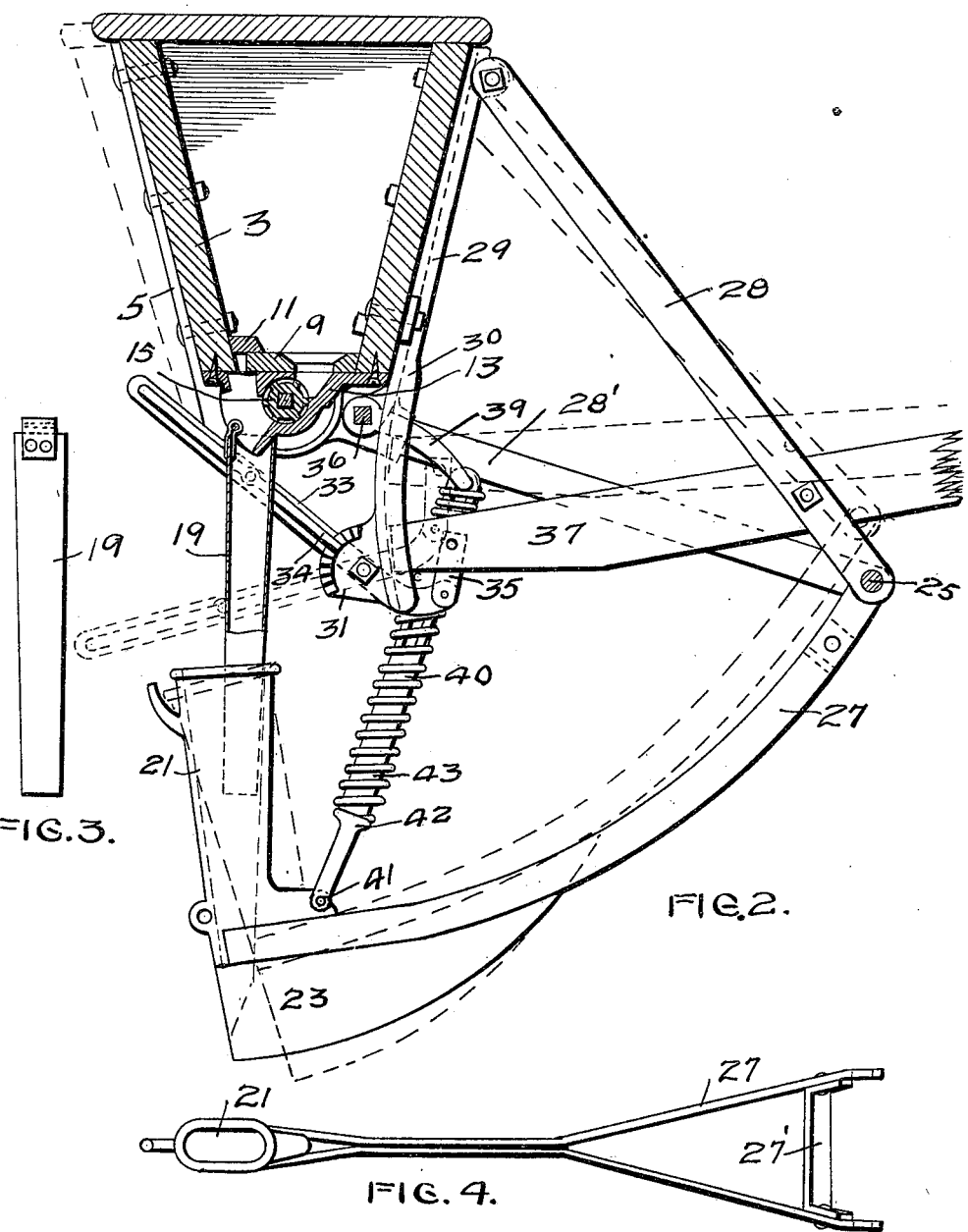

UNITED STATES PATENT OFFICE.

DAVID J. AMES AND HENRY N. LABARE, OF OWATONNA, MINNESOTA, ASSIGNORS TO THE OWATONNA MANUFACTURING COMPANY, OF SAME PLACE.

GRAIN-DRILL.

SPECIFICATION forming part of Letters Patent No. 643,446, dated February 13, 1900.

Application filed November 13, 1899. Serial No. 736,721. (No model.)

*To all whom it may concern:*

Be it known that we, DAVID J. AMES and HENRY N. LABARE, of Owatonna, county of Steele, State of Minnesota, have invented new and useful Improvements in Grain-Drills, of which the following is a specification.

This invention relates to improvements in grain-drills, and particularly to improvements in means for tilting the drill-shoes and parts connected therewith, so as to enable the operator to set said shoes at any desired angle to the surface of the ground.

The invention further relates to improvements in the construction of the grain receptacle or hopper and to improvements in the construction of the draft-bars to which the shoes are connected.

The invention consists generally in the constructions and combinations hereinafter described, and particularly pointed out in the claims.

In the accompanying drawings, forming part of this specification, Figure 1 is a perspective view of a grain-drill embodying our invention. Fig. 2 is a partial section and elevation illustrating the invention. Fig. 3 is a detached detail view of the swinging tube by means of which the grain is conducted from the drill-cup to the hollow shank of the shoe. Fig. 4 is a plan view of one of the shoes and the draft-bar connected therewith. Fig. 5 is a detail showing the hollow stub-axle formed integrally with the end of the hopper.

In the drawings, 2 2 represent the wheels for supporting the drill and driving the feed mechanisms thereof.

3 is the grain hopper or receptacle, preferably having its sides, top, and bottom constructed of wooden plank of suitable strength and thickness. Each end of the hopper is preferably formed of a cast-metal plate 5, having a hollow stub-axle 7 formed integrally therewith. The usual axle extending across the machine is done away with, and in place thereof the hopper or receptacle 3 serves as an axle in conjunction with the two hollow stub-axles 7. We prefer also to provide a bottom for the hopper 3, consisting of the overlapping plates 9 and 11. Each of these plates has one edge secured to one of the long walls of the hopper at the bottom thereof, and the edges of the plates overlap, as shown in Fig. 2 of the drawings, thereby forming a tight joint, but at the same time permitting the two parts of the bottom to move toward or from each other as the hopper expands or contracts. Beneath the part 9 of the bottom, which is provided with suitable openings, are the grain-cup-casings 13 in which the cup-wheels 15 are located. Said wheels are preferably provided upon their periphery with a series of pockets or cups, and as they rotate they receive grain in these pockets or cups and discharge the same into the pivoted tubes 19, and from these tubes the grain passes into and through the hollow shanks 21 of the shoes 23.

In another application of even date herewith we have described and claimed the means by which the cup-wheels are driven from the main supporting and driving wheel, and also in another application of the same date the means whereby a continuous flow of the grain from the hopper for each shoe is maintained.

At the front of the machine is the transverse draw-bar 25, to which all of the draft-bars 27 of the shoes 23 are connected. (See Figs. 1 and 2.) Suitable braces 28 run from the rod 25 to the upper part of the hopper 3, where they are preferably connected to a suitable casting 29, extending downward in front of and below said hopper. (See Figs. 1 and 2.) This casting is provided with the forwardly-projecting flanges 30, and in the space between these flanges the rear end of the pole 37 is arranged. At its lower end the casting 29 is provided with a stationary toothed segment 31, and a lever 33 is pivoted to the part 29 and is provided with a latch 34, adapted to engage any one of the teeth upon the segment 31, and thereby to lock said lever in any desired position. The lever 33 is connected by a suitable link 35 to the rear end of the tongue or pole 37. (See Figs. 1 and 2.) A rod or shaft 36 is mounted so as to turn in bearings or hangers 38, arranged upon the hopper 3. (See Fig. 1.) This shaft has secured to it a series of arms 39, each of which is in turn connected to the upper end of a slotted rod 40, whose lower end is pivotally connected at 41 to the forward portion of the shank of the shoe. A spring 43 surrounds the rod 40, its lower end bearing against the collar or projection 42 on said rod and its upper end engaging the end of the arm 39. By this means each of said shoes is held upon the ground with a yielding or spring pressure and is capable of upward movement to permit the shoe to pass over stones or other obstructions. We also prefer to provide suitable braces 28', which extend from the draft-rod 25 and are connected to the hopper at or near the bottom thereof, the braces 28 being connected to the hopper near the top thereof. We also prefer to construct the draft-bars 27 as shown in Figs. 2 and 4 of the drawings. As here shown, each of these draft-bars consists of two bars secured together and separated at their rear ends to pass upon the sides of the shank 21 of the shoe 23 and having their forward ends also separated in front of the shoe, with a brace-bar 27' arranged between the forward ends of the two parts of the draft-bar and riveted into position therein. With this construction it is unnecessary to provide tubes or similar devices upon the draft-rod 25 for the purpose of separating the parts of the draft-bars.

The advantages of this construction are that with the tilting lever extending beneath the hopper and to the back of the machine the operator can, while walking along behind the machine, move this lever, and thereby tilt the shoes into any desired position without stopping the machine. In using this grain-drill upon soft ground the shoes may bear upon the ground for substantially their full length, and if there is any straw or similar material on the ground the shoes will readily pass over it; but where the ground is hard it is desirable to tilt the shoes by raising their forward ends, leaving the heels in position to cut into the hard ground. In this case straw and other material on the ground will collect under the forward part of the shoe. To clear the shoe of this material, it is then necessary to tilt the shoes by lowering the forward ends, when they will readily pass over any such material.

Having thus described our invention, we claim as new and desire to secure by Letters Patent—

1. The combination, in a grain-drill, with the hopper provided with the cast-metal end plates and the hollow axles formed integrally with said end plates, for the purpose set forth.

2. The combination, in a grain-drill, with the hopper and feed mechanism, of the hopper-bottom consisting of longitudinally-overlapping plates 9 and 11, substantially as described.

3. The combination, in a grain-drill, with the hopper, the pivoted shoes and the feed mechanism, of the casting or hanger extending downward from said hopper, a lever pivoted to said casting or hanger and extending below and back of said hopper, the pole or tongue 37 and a link connecting said lever with said pole, for the purpose set forth.

4. The combination, in a grain-drill, with the hopper and the pivoted shoes, of the casting 29 extending downward from said hopper and provided with the flanges 30, the tongue 37 having its rear end extending between said flanges and the lever 34 pivoted to said casting 29 and connected by a link 35 to said tongue 37, for the purpose set forth.

5. The combination, in a grain-drill, with the pole or tongue pivoted at a point forward of its rear end, means for raising or lowering the rear end of the tongue, and the pivoted drill-shoes.

In testimony whereof we have hereunto set our hands this 12th day of October, 1899.

DAVID J. AMES.
HENRY N. LABARE.

In presence of—
C. J. O'BRIEN,
L. S. DISBROW.